US006422768B1

(12) United States Patent
Sanada

(10) Patent No.: US 6,422,768 B1
(45) Date of Patent: Jul. 23, 2002

(54) APPLICATION DEVICE AND APPLICATION METHOD

(75) Inventor: Kazuo Sanada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 83 days.

(21) Appl. No.: 09/628,952

(22) Filed: Jul. 28, 2000

(30) Foreign Application Priority Data

Aug. 2, 1999 (JP) .......................................... 11-218745

(51) Int. Cl.[7] ................................................ G03D 3/02
(52) U.S. Cl. ....................................... 396/626; 396/627
(58) Field of Search ................................ 396/604, 627, 396/626; 118/52; 347/41

(56) References Cited

U.S. PATENT DOCUMENTS 5,779,377 A * 7/1998 Kumai et al. ................. 347/41
6,001,544 A * 12/1999 Makuta et al. .............. 430/405
6,318,832 B1 * 11/2001 Bates et al. .................... 347/15

* cited by examiner

*Primary Examiner*—D Rutledge
(74) *Attorney, Agent, or Firm*—Sughrue Mion, PLLC

(57) ABSTRACT

An application device in which uneven application due to a clogged nozzle can be suppressed. Rows of plural spray holes are formed in the nozzle plate with the holes being disposed in a staggered, lattice-like configuration with an odd number of spray hole rows being aligned along a conveying direction of an image recording material. Each time a conveyed distance of the image recording material is a distance corresponding to a distance between two adjacent rows times one-half of the odd number of the spray hole rows, the image forming solvent is sprayed. By setting an arrangement of the spray holes and a spray interval of the spray holes, the solvent can be sprayed and applied between rows of solvent which were previously sprayed and applied.

25 Claims, 11 Drawing Sheets

APPLICATION DEVICE AND APPLICATION METHOD

BACKGROUND OF THE INVENTION

1. Field of the Invention

The present invention relates to an application device and an application method for spraying a solvent for image formation onto an image recording material such as a photosensitive material or an image-receiving material or the like.

2. Description of the Related Art

There are image forming devices which carry out image recording processing by superposing, one on the other, an image-receiving material and a photosensitive material to which water has been applied as a solvent for image formation, and thermally processing the superposed materials. However, because water is applied by the photosensitive material being immersed in a tank in which water is stored, bacteria proliferate on the organic matter which has slightly eluded from photosensitive materials, and the water becomes dirty, causing image quality to deteriorate.

In order to solve such a problem, as illustrated in FIG. 8, a non-contact-type application device 104 has been proposed in which small water droplets are sprayed out from a plurality of nozzles 102 formed at a thin nozzle plate 100, such that the water droplets are applied to a photosensitive material 16.

A storing portion filled with water is provided at a spraying head 108 of the application device 104. By applying pressure to this storing portion, the water droplets are sprayed and atomized from the nozzles 102, and adhere to the photosensitive material 16.

At the spraying head 108, so-called overlapping spraying is carried out such that, even if one of the nozzles 102 becomes clogged or the position at which an atomized water droplet is shot is out of place, water can be applied uniformly to the photosensitive material 16.

Specifically, as illustrated in FIG. 9, staggered nozzles 102 which are disposed in 8 rows in the conveying direction of the photosensitive material (and are disposed symmetrically to the left and right of a central line C of the rows) are used. Each time the photosensitive material is conveyed in the direction of arrow A by a distance L corresponding to a length which is half of a row width, atomized water droplets are sprayed out.

Let us suppose that the nozzle corresponding to the blank circle w6 which is the third circle from the top in the sixth row is clogged. (The nozzles are actually continuous along a direction orthogonal to the conveying direction in a pattern of eight rows). Next, it will be considered to what extent the area of the photosensitive material 16, which should have originally had water applied thereto by the nozzle corresponding to the blank circle W6, can be covered the next time spraying is carried out (overlapping spraying).

As illustrated in FIG. 10A, looking at the surface of the photosensitive material on which water droplets have been shot, even if the blank circle W6 is clogged, water can be applied at hatched portions A1 at the peripheral blank circles W5, W$6_U$, W$6_D$, W7. Next, as illustrated in FIG. 10B, when overlapping spraying is carried out, the nozzles corresponding to a hatched circle B$2_U$ (the second circle in the second row) and a hatched circle B$2_D$ (the third circle in the second row) apply water to an area A2 (represented by hatching). As illustrated in FIGS. 10C and FIG. 11, the nozzles corresponding to a hatched circle B1 (the third circle in the first row) and a hatched circle B3 (the third circle in the third row) apply water to areas A3. In actuality, all of the circles overlap, but in order to be able to distinguish the respective circles, they are illustrated as separate from one another.

As a result, water is not applied to two substantially triangular areas A4, which are illustrated in white. Uneven application caused by nozzle clogging cannot be suppressed, and the application device cannot be made more reliable.

SUMMARY OF THE INVENTION

In view of the aforementioned, an object of the present invention is to provide an application device and application method in which uneven application due to nozzle clogging can be reduced without changing the density at which water droplets are shot.

In a first aspect of the present invention, an application device is provided with a plurality of nozzles which spray and apply a solvent for image formation onto an image recording material. The solvent is sprayed from the nozzles, in accordance with a moved amount of the image recording material, such that the positions on the image recording material at which the solvent is applied overlap one another. In this way, by carrying out so-called overlapping spraying, uneven application due to the clogging of a nozzle can be suppressed.

By spraying and applying solvent between rows of solvent which were previously sprayed and applied, even if one of the nozzles is clogged, the nozzles can apply the solvent to the greatest extent possible to the area of the image recording material to which the solvent should be applied.

In a second aspect of the present invention, the nozzles of the application device are disposed in 2m+1 rows, which is an odd number of rows, at intervals of L in the conveying direction of the image recording material, and are disposed in a staggered arrangement. Each time the image recording material is conveyed by a distance L(2m+1)/2, the solvent is sprayed. Note that m is an integer.

Because the nozzles are arranged as described above and because the solvent is sprayed at the timing described above, the solvent can be sprayed and applied between rows of solvent which were previously sprayed and applied. Further, by making the number of nozzle rows a odd number (2m+1), even if a nozzle becomes clogged and the position at which a drop of solvent is applied comes out of place, solvent can be applied uniformly.

DESCRIPTION OF THE PREFERRED EMBODIMENTS

Summary of Image Forming Device

Figure 1:
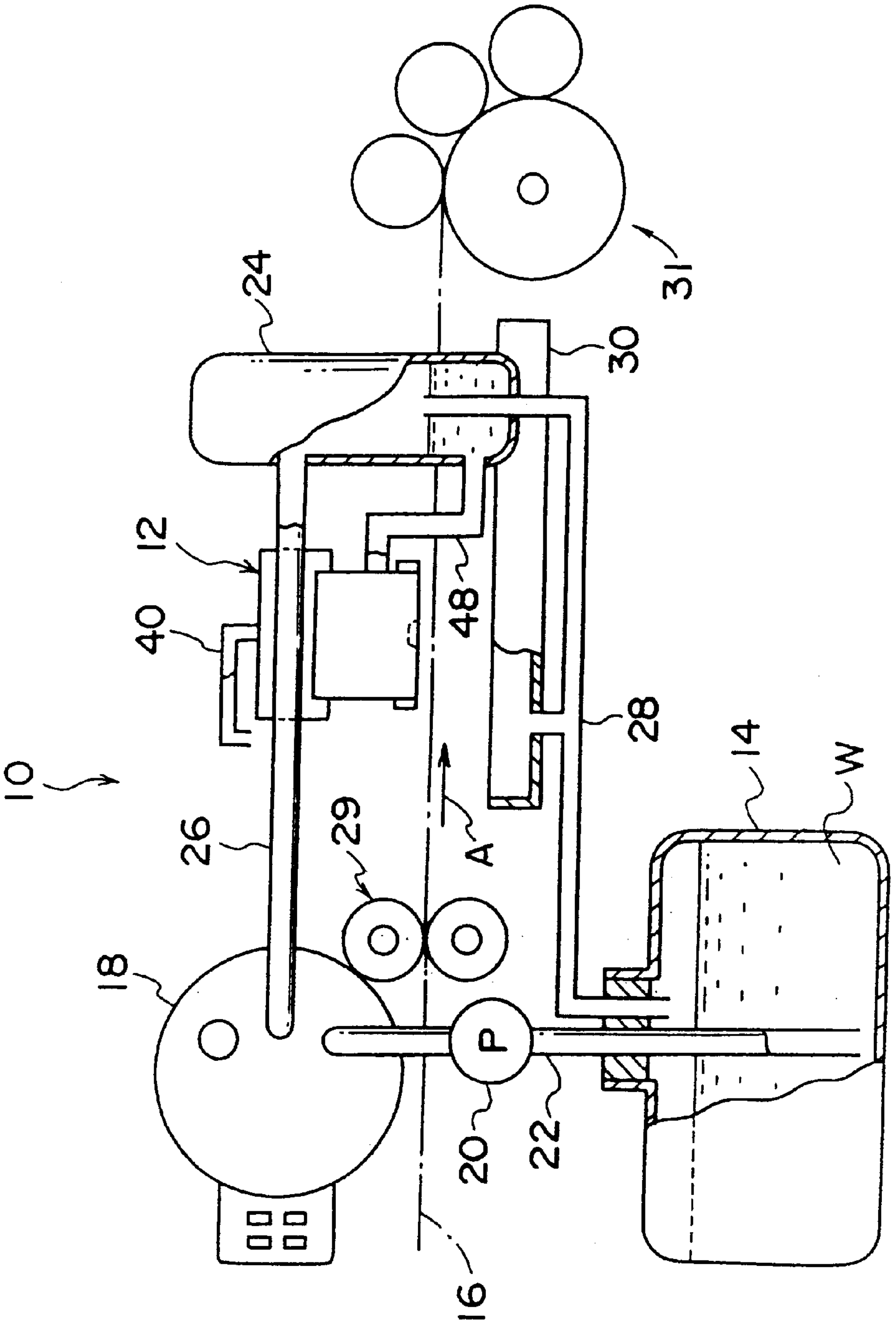
FIG. 1 is a structural view of an application device relating to an embodiment of the present invention.

As illustrated in FIG. 1, in an image forming device, a photosensitive material 16 on which an image has been exposed is fed by feed rollers 29. In an application device 10, after water W serving as a solvent for image forming has been sprayed out and applied to the photosensitive material 16, the photosensitive material 16 is conveyed into a heat developing transfer section by feed rollers 31. At the heat developing transfer section, the photosensitive material 16 to which water has been applied is superposed with an image-receiving material, and is trained around an outer periphery of a heating drum.

Both materials are conveyed and nipped at a predetermined pressure between an endless belt and the heating drum. The photosensitive material 16 is heat-developed, and the image is transferred onto the image-receiving material. The image-receiving material to which the image has been transferred and the photosensitive material 16 whose image has been transferred are peeled from the heat drum, and are respectively discharged to predetermined trays.

Application Device

Figure 2:
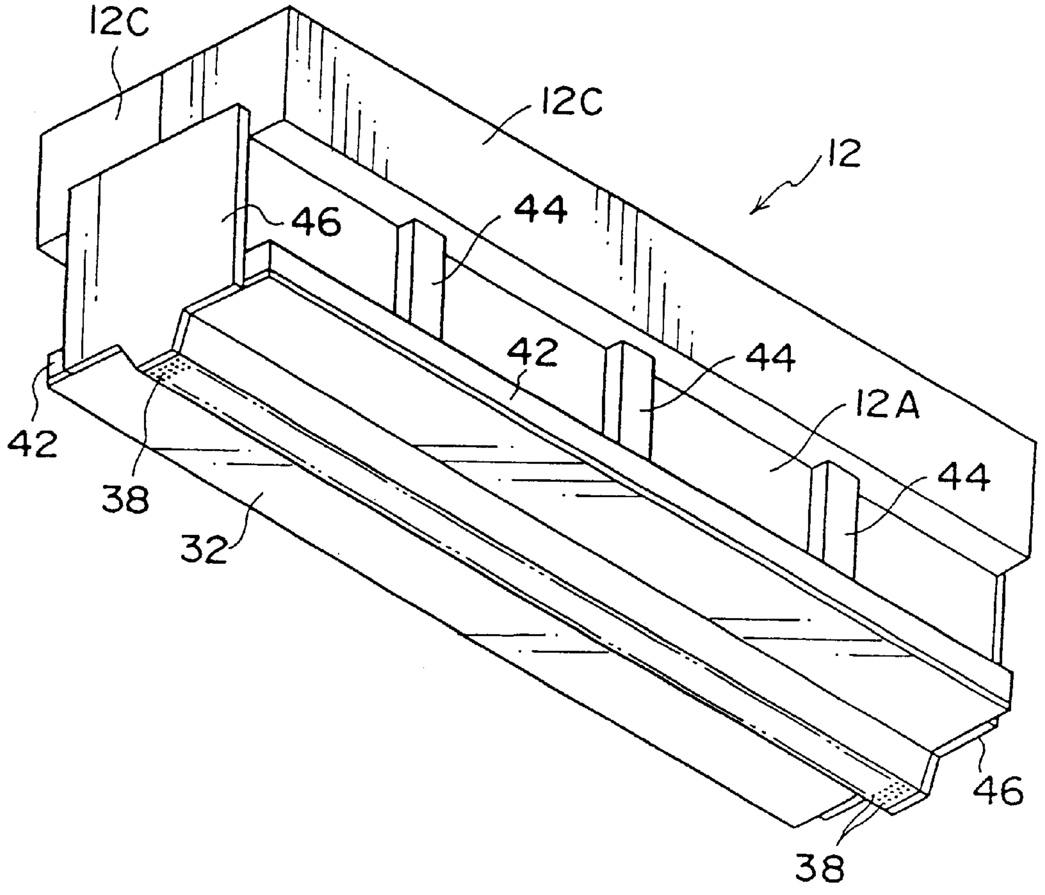
FIG. 2 is a perspective view of a spraying head of the application device relating to the embodiment.
Figure 3:
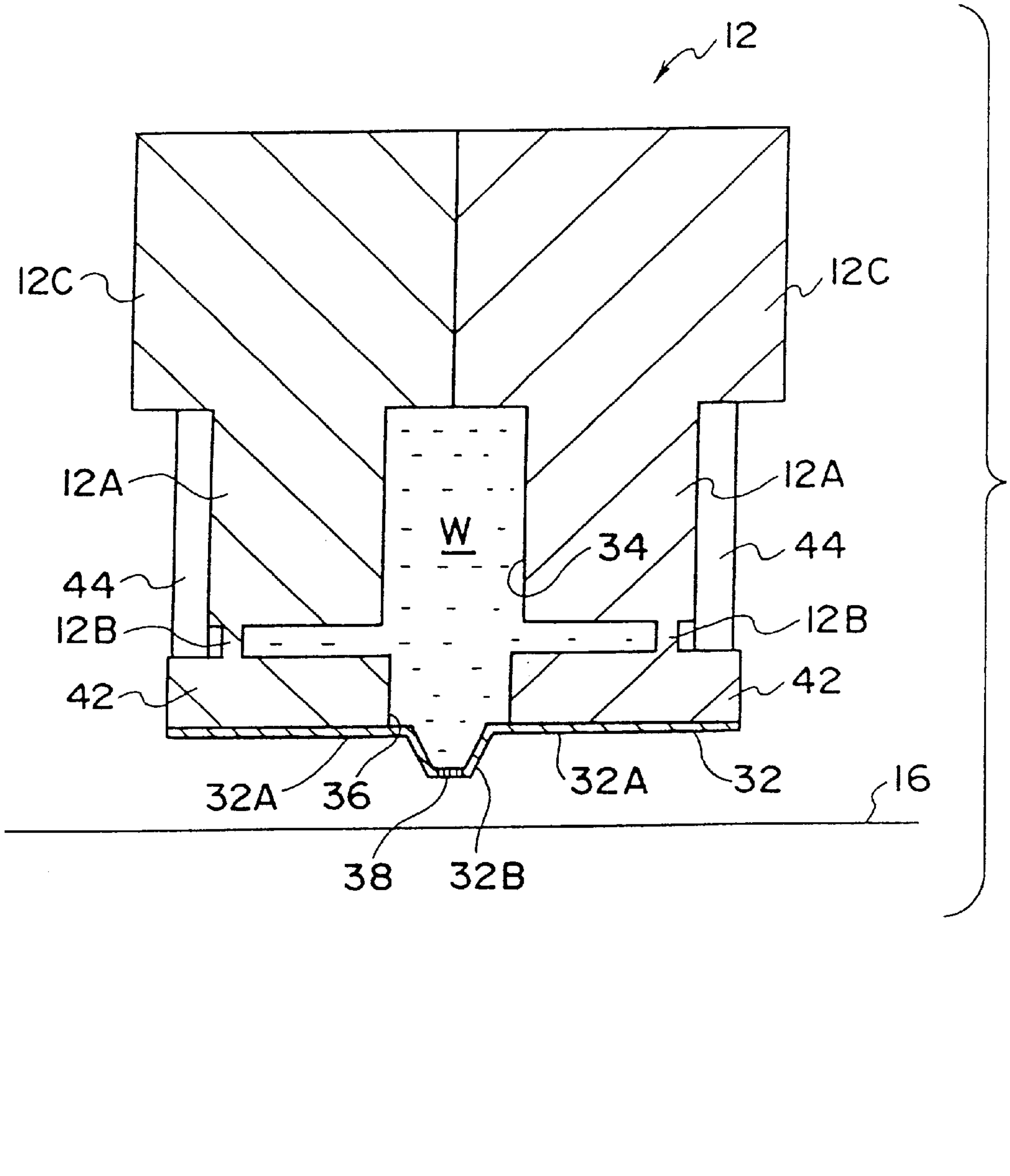
FIG. 3 is a cross-sectional view of the spraying head of the application device relating to the embodiment.

As illustrated in FIGS. 1 through 3, the application device 10 relating to the present embodiment has a spray head 12 which sprays water. A water bottle 14, which stores water W which is to be supplied to the spray head 12, is disposed at the lower left side of the spray head 12. A filter 18 which filters water is provided above the water bottle 14. A first water feed pipe 22, at which a pump 20 is disposed, is connected between the water bottle 14 and the filter 18.

A sub-tank 24, which stores water which has been sent from the water bottle 14, is provided at the right side of the spray head 12. A second water feed pipe 26 extends from the filter 18 to the sub-tank 24.

Accordingly, when the pump 20 is operated, water, which has passed from the water bottle 14 through the filter 18 so as to be filtered, is fed to the sub-tank 24, and is stored for a time in the sub-tank 24.

Further, a third water feed pipe 48, which connects the sub-tank 24 and the spray head 12, is disposed between the sub-tank 24 and the spray head 12. The water, which is fed by the pump 20 from the water bottle 14 via the filter 18, the sub-tank 24, the third water feed pipe 48 and the like, is filled into the spray head 12.

A tray 30, which is connected to the water bottle 14 by a circulation pipe 28, is disposed beneath the spray head 12. The water which has overflowed out from the spray head 12 gathers in the tray 30, and is returned to the water bottle 14 via the circulation pipe 28. One end of the circulation pipe 28 is disposed in the sub-tank 24. The circulation pipe 28 functions as an overflow pipe which returns to the water bottle 14 the water in excess of that needed to fill the sub-tank 24.

Figure 4:
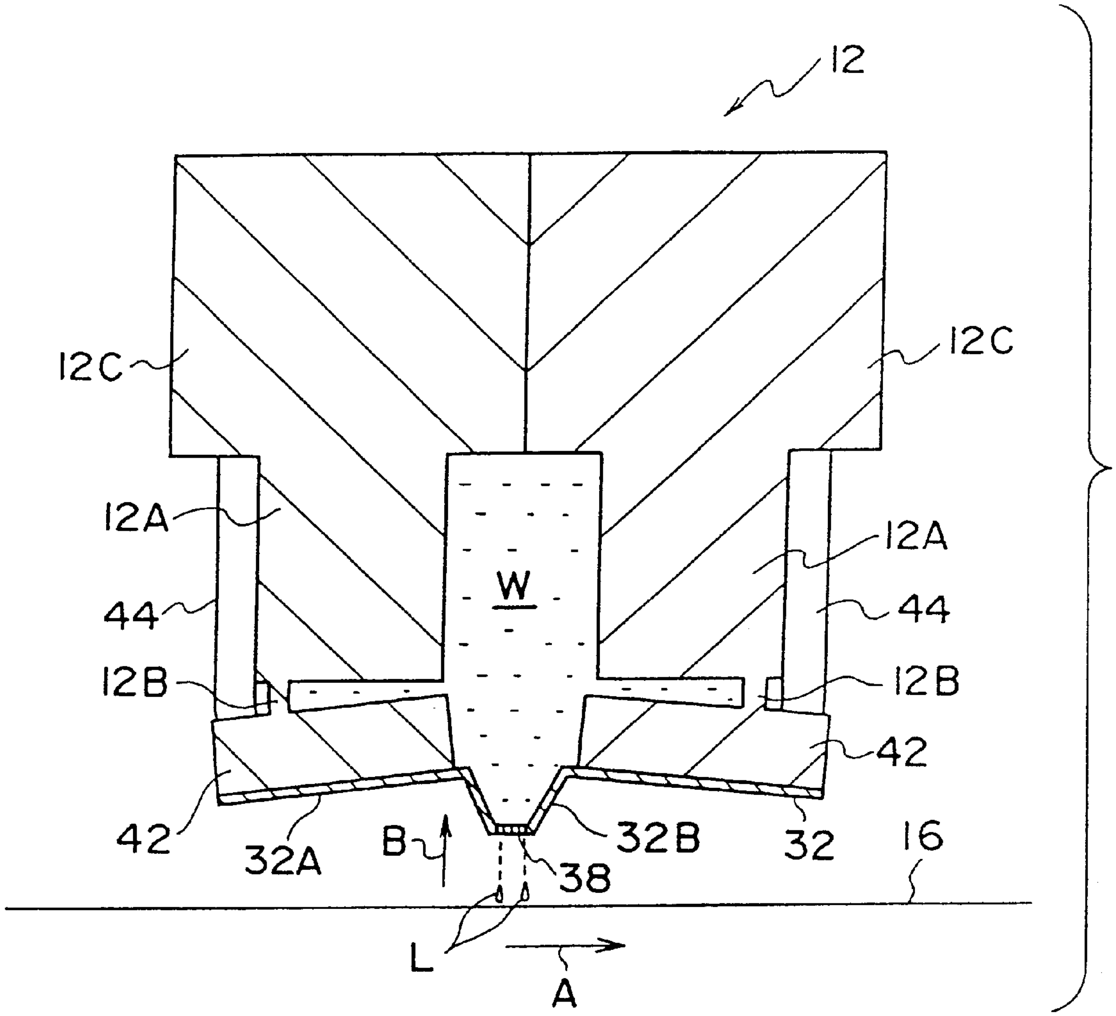
FIG. 4 is a cross-sectional view of the spraying head of the application device relating to the embodiment.

Further, as illustrated in FIGS. 2 through 4, a nozzle plate 32 is provided at the conveying path side of the spray head 12. The nozzle plate 32 is formed by bending, into a hat-like shape, a rectangular, elastically-deformable thin plate. The nozzle plate 32 is formed by a convex portion 32B which projects out in a trapezoid shape, and plate portions 32A which jut out in the same plane from the sides of the convex portion 32B.

The plate portions 32A of the nozzle plate 32 are joined by an adhesive to lever plates 42 which are disposed at sides of an opening 36. The convex portion 32B closes the opening 36 of a storing portion 34 of the spray head 12. Nozzles 38 (each having a diameter of, for example, several tens of $\mu$m), which spray the water filled in the storing portion 34, are formed in the peak surface of the convex portion 32B, in seven rows (an odd number of rows) disposed along a conveying direction A of the photosensitive material 16, with the nozzles 38 being disposed at uniform intervals. The nozzles 38 are aligned along the entire transverse direction of the photosensitive material 16 in a staggered manner with the respective center points of three adjacent nozzles 38 being the vertices of a triangle. Further, the nozzles 38 are circular, and water droplets of substantially the same volume can be sprayed from the nozzle holes 38.

As illustrated in FIG. 1, an exhaust pipe 40 extends from the top portion of the spray head 12. The exhaust pipe 40 can communicate the interior and the exterior of the spray head 12. A valve (not shown) which opens and closes the exhaust pipe 40 is provided in the exhaust pipe 40. By opening and closing this valve, the interior of the spray head 12 can be made to communicate with or can be closed off from the outside air.

The lever plates 42 are fixed to side walls 12A of the spray head 12 via thin-width supporting portions 12B formed at the bottom portions of the side walls 12A. Plural piezo-electric elements 44 which are actuators are adhered beneath top walls 12C of the spray head 12. The outer end sides of the lever plates 42 are adhered to the bottom surfaces of the piezo-electric elements 44, so that the piezo-electric elements 44 and the lever plates 42 are connected.

Accordingly, a lever mechanism is formed by the piezo-electric elements 44, the lever plates 42, and the supporting portions 12B. As illustrated in FIG. 4, when the outer end sides of the lever plates 42 are moved by the piezo-electric elements 44, the inner end sides of the lever plates 42 move in the direction opposite to this movement. The piezo-electric elements 44 are formed by, for example, layered piezo-electric ceramics, and the axial direction displacement of the piezo-electric elements 44 is large. Further, the timing for applying voltage to the piezo-electric elements 44 is controlled by a controller (not illustrated). The aforementioned valve for opening and closing the exhaust pipe 40 also is connected to this controller, and the controller controls the opening and closing of the valve.

Thin sealing plates 46 are adhered to the longitudinal direction end portions of the nozzle plate 32 (see FIG. 2). An elastic adhesive which is, for example, a silicone rubber adhesive, is filled in at the inner sides of the sealing plates 46 in the gaps formed between the sealing plates 46 and the nozzle plate 32, so that water does not leak therefrom. Accordingly, the gaps at the longitudinal direction ends of the spray head 12 can be sealed by an elastic adhesive without hindering the movement of the left and right ends of the nozzle plate 32. Further, the left and right ends of the spray head 12 may be sealed by using only an elastic adhesive and without using the thin sealing plates 46.

When electricity is supplied to the piezo-electric elements 44, as illustrated in FIG. 4, the piezo-electric elements 44 extend, and as the lever plates 42 rotate around the supporting portions 12B, the piezo-electric elements 44 deform and displace the nozzle plate 32 such that the central portion of the nozzle plate 32 is made to rise up along the direction of arrow B. As the nozzle plate 32 is deformed, the pressure of the water within the spray head 12 increases such that water droplets L which are small amounts of water are sprayed at once in lines from the nozzle holes 38 aligned in the seven rows.

By repeatedly supplying electricity to the piezo-electric elements 44, the piezo-electric elements 44 repeatedly extend, such that the water droplets L can be sequentially sprayed from the nozzles 38.

The volume of one water droplet L can be adjusted by varying the conditions of the variation width (nozzle amplitude) at portions corresponding to the nozzles 38 at the time that the nozzle plate 32 is displaced by the piezo-electric elements 44.

Figure 5:
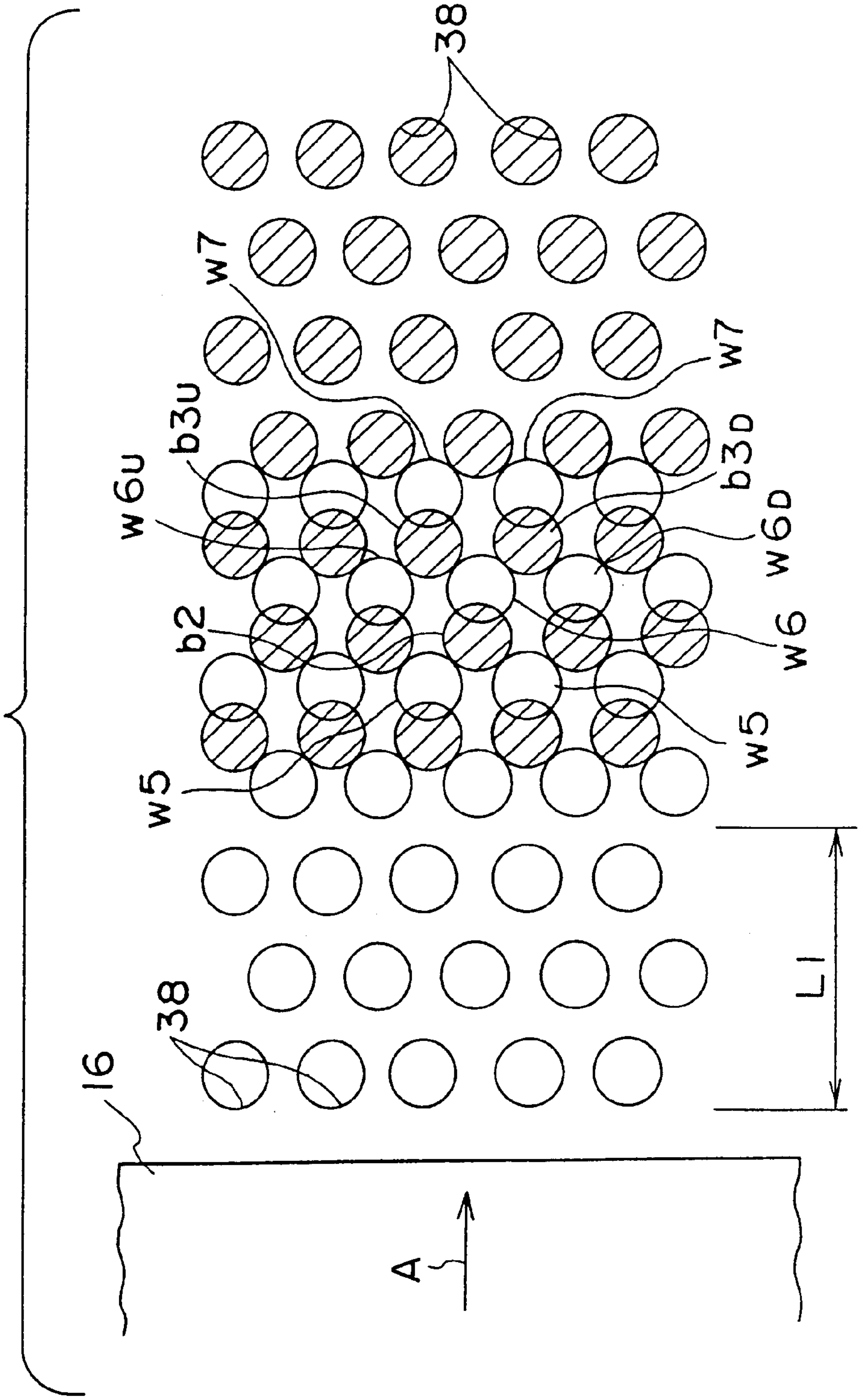
FIG. 5 is a view for explaining a state in which a nozzle of the application device relating to the present embodiment has sprayed out droplets twice.

As illustrated in FIGS. 6A through 6D and FIG. 7, the water droplets L are made to adhere to the surface of the photosensitive material 16 by spraying the water droplets L repeatedly at a timing which appropriately corresponds to the conveying speed of the photosensitive material 16, i.e., at a timing of spraying water at the instant the nozzle 38 illustrated by a hatched circle in FIG. 5 is positioned between conveying direction rows of the nozzles 38 shown by the blank circles, in other words, by spraying the water droplets L each time the photosensitive material 16 is conveyed a distance equal to one-half of the seven rows (a distance L1 equal to 3.5 rows). Further, because the central point of each of the expelled water droplets L forms the vertex of an equilateral triangle, all of the water droplets can coagulate with the minimum amount of water being used.

Next, operation of the application device will be described.

The valve of the exhaust pipe 40 is closed by the controller. In this state, when water is atomized and sprayed from the nozzles 38, voltage controlled by the controller is applied to the piezo-electric elements 44, and the piezo-electric elements 44 are all deformed so as to extend simultaneously.

When the piezo-electric elements 44 are deformed in this way, the displacement of the pair of lever plates 42 is transmitted to the nozzle plate 32, and the nozzle plate 32 is displaced such that the water within the spray head 12 is pressurized. As a result, the water filled in the spray head 12, while being atomized, sprayed from the nozzles 38, and can be made to adhere to the photosensitive material 16 which is being conveyed.

Then, water is sprayed from the nozzles 38 at a timing at which the photosensitive material 16 is conveyed by a distance (3.5 rows=L1) which is one-half of the nozzle rows, at the conveying speed of the photosensitive material 16. The water is thereby applied twice (overlappingly applied) on the entire surface of the photosensitive material 16).

Here, with reference to FIG. 5, let us suppose that the nozzle of the blank circle w6, which is the third circle from the top in the sixth row is clogged. (The nozzles actually continue in the direction orthogonal to the conveying direction in the seven-row pattern.) Let us now consider to what extent water can be compensatorily applied, at the time of the next spraying (overlapping spraying), to the area of the photosensitive material at which a water droplet L should have be en applied by the nozzle of the blank circle W6.

Figure 6D:
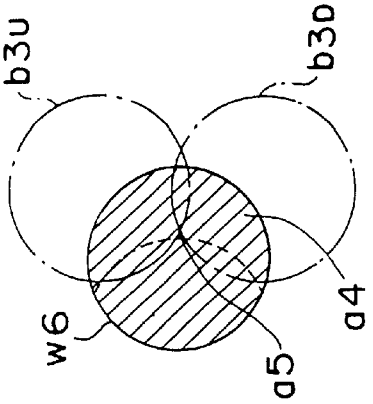
FIG. 6D is a view for explaining a state on the photosensitive material on which droplets have been sprayed out twice in the application device relating to the embodiment.
Figure 6C:
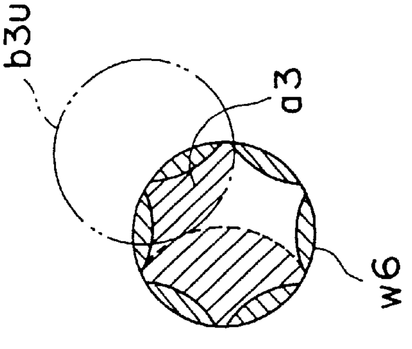
FIG. 6C is a view for explaining a state on the photosensitive material on which droplets have been sprayed out twice in the application device relating to the embodiment.
Figure 6B:
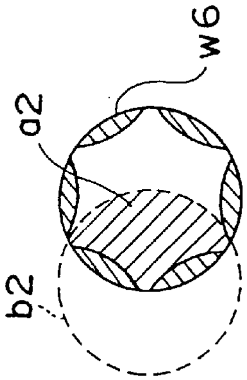
FIG. 6B is a view for explaining a state on the photosensitive material on which droplets have been sprayed out twice in the application device relating to the embodiment.
Figure 6A:
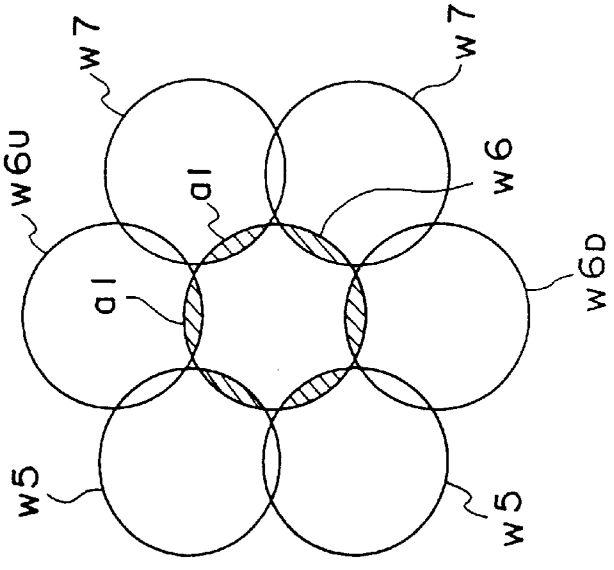
FIG. 6A is a view for explaining a state on a photosensitive material on which droplets have been sprayed out twice in the application device relating to the embodiment.
Figure 7:
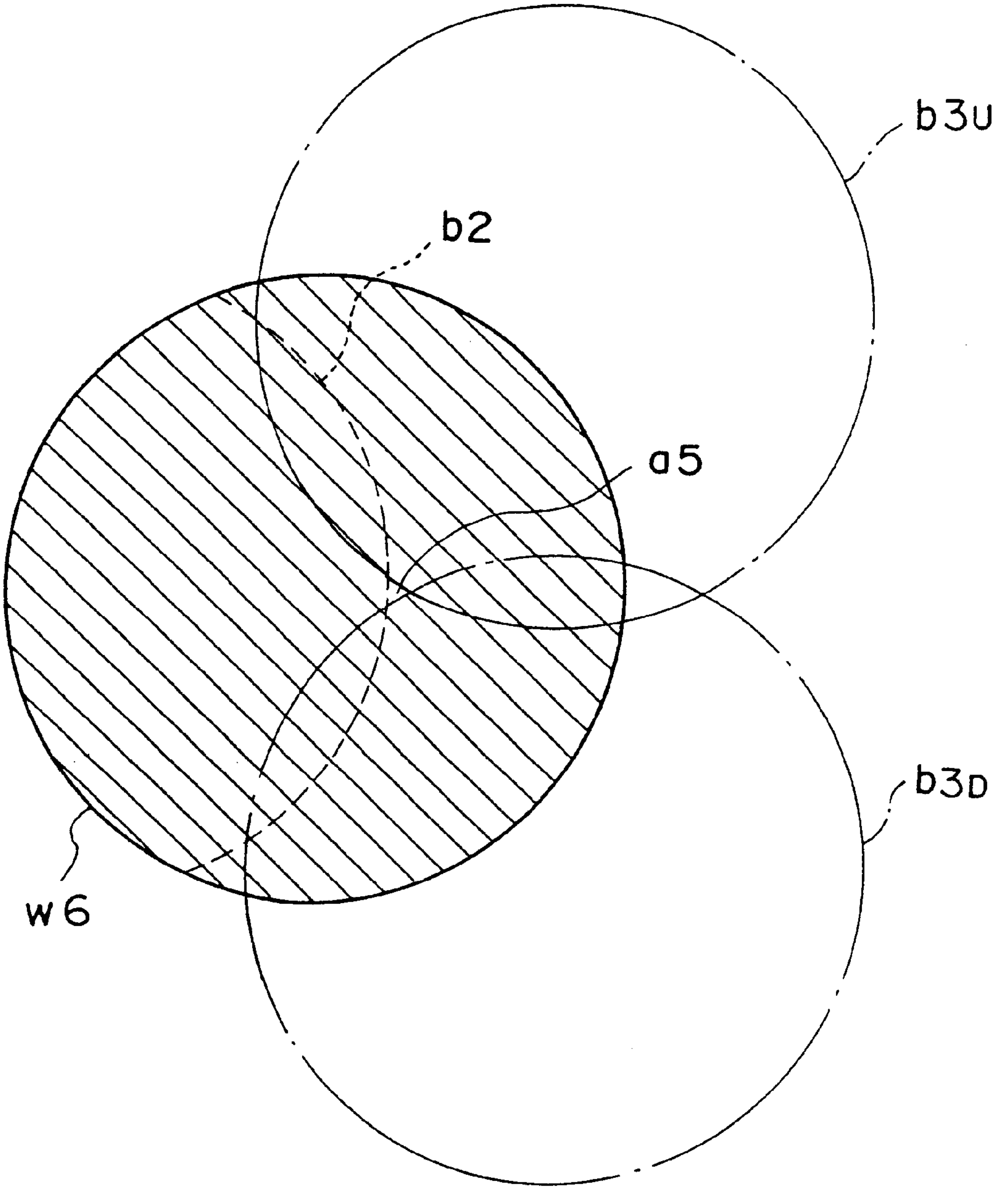
FIG. 7 is an enlarged view for explaining a state on the photosensitive material on which droplets have been sprayed out twice in the application device relating to the embodiment.
Figure 8:
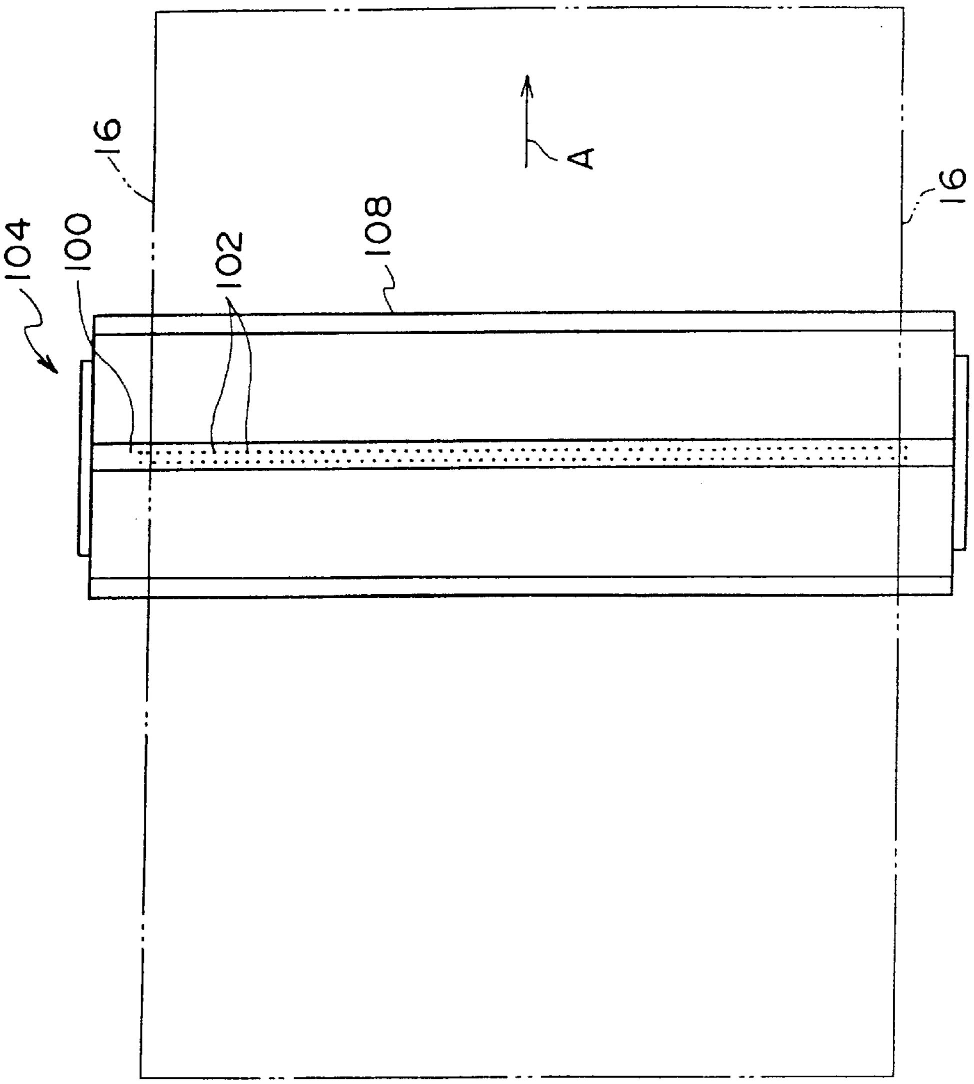
FIG. 8 PRIOR ART
FIG. 8 is a bottom view as seen from the bottom of a nozzle plate of a spraying head of a conventional application device.
Figure 9:
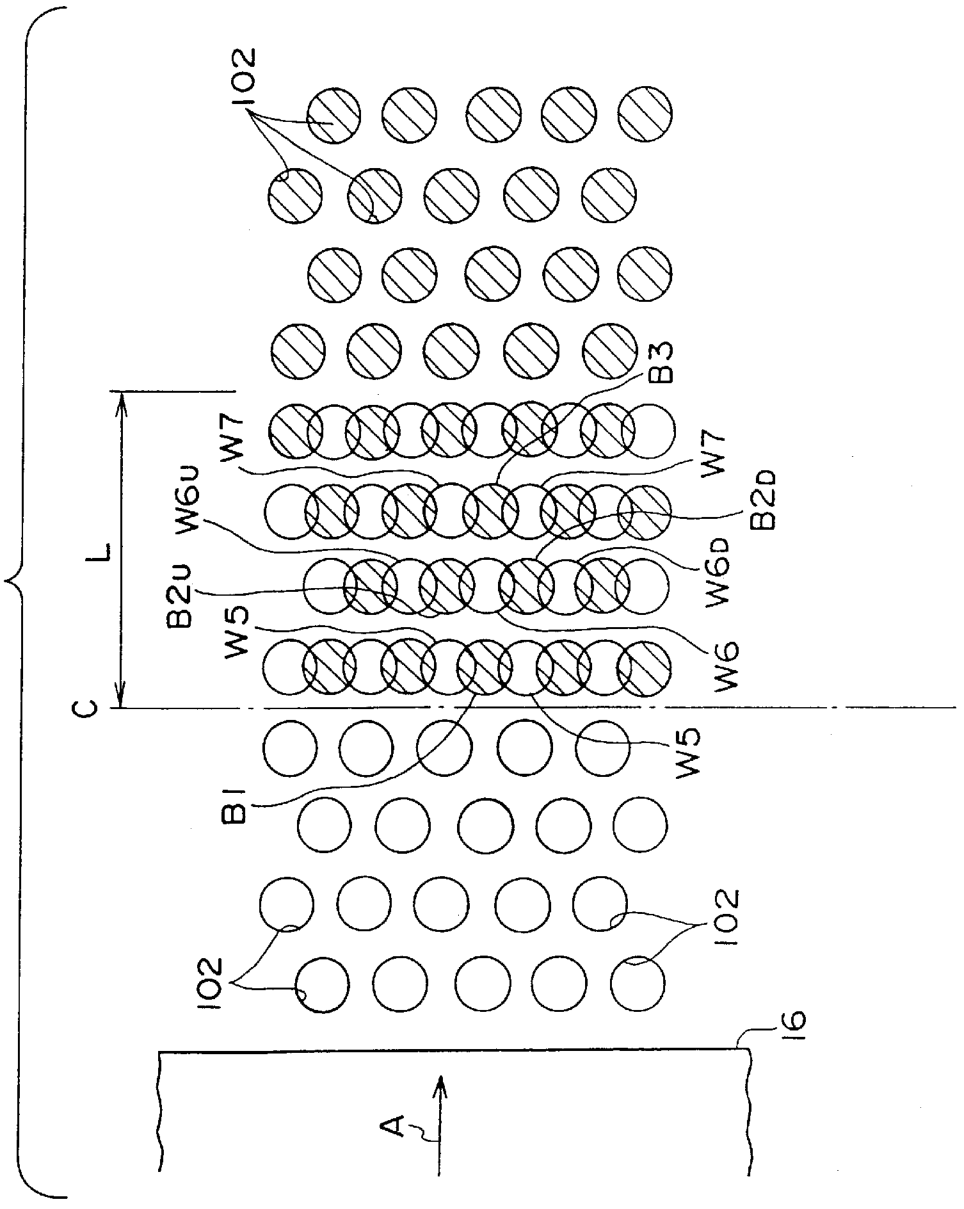
FIG. 9 PRIOR ART
FIG. 9 is a view for explaining a state in which a nozzle of a conventional application device has sprayed out droplets twice.
Figure 10A:
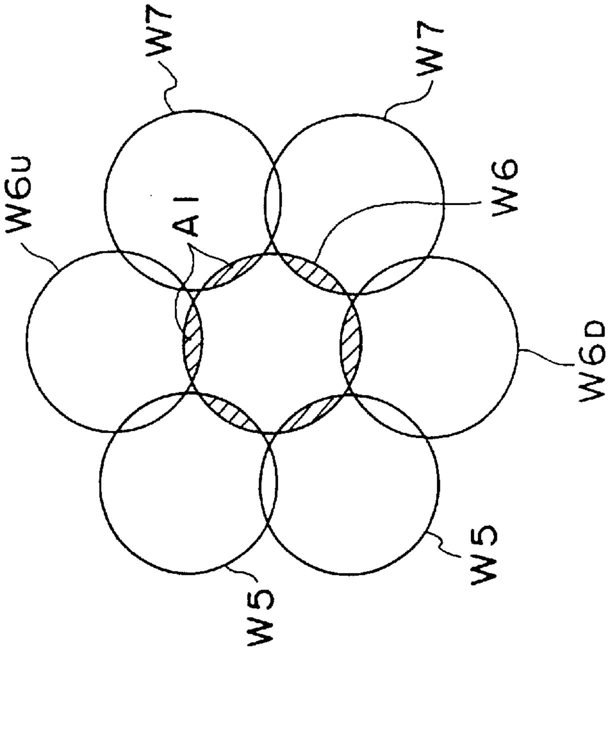
FIG. 10A PRIOR ART
FIG. 10A is a view for explaining a state on a photosensitive material on which droplets have been sprayed out twice in a conventional application device.
Figure 10B:
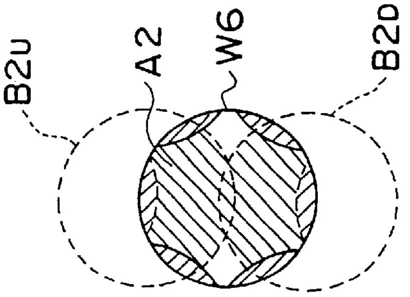
FIG. 10B PRIOR ART
FIG. 10B is a view for explaining a state on the photosensitive material on which droplets have been sprayed out twice in the conventional application device.
Figure 10C:
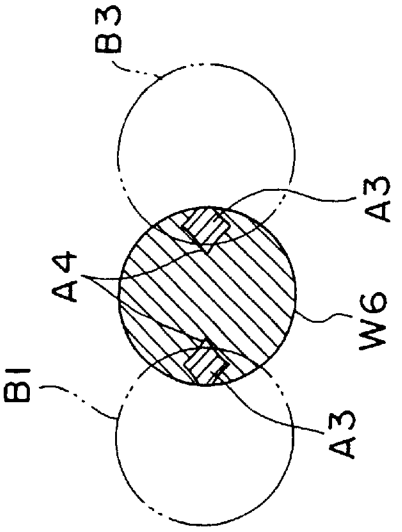
FIG. 10C PRIOR ART
FIG. 10C is a view for explaining a state on the photosensitive material on which droplets have been sprayed out twice in the conventional application device.

As illustrated in FIG. 6A, as viewed from above the photosensitive material to which the water droplets are applied, even if the blank circle w6 is clogged, water is applied to the hatched portions a1 by the surrounding blank circles w5, w$\mathbf{6}_U$, w$\mathbf{6}_D$, w7. Next, as shown in FIGS. 6B and 6C, when overlapping spraying is carried out between the rows, the nozzle of hatched circle b2 (the third circle in the second row) applies water to the area a2, and the nozzle of hatched circle b$\mathbf{3}_U$ (the third circle in the third row) applies water to the area a3 (illustrated by hatching). As shown in FIGS. 6D and in FIG. 7, the nozzle of hatched circle b$\mathbf{3}_D$ (the fourth circle in the third row) applies water to the area a4. In actuality, all of the circles are overlapping, but they are illustrated as being separate from one another to facilitate differentiation.

Figure 11:
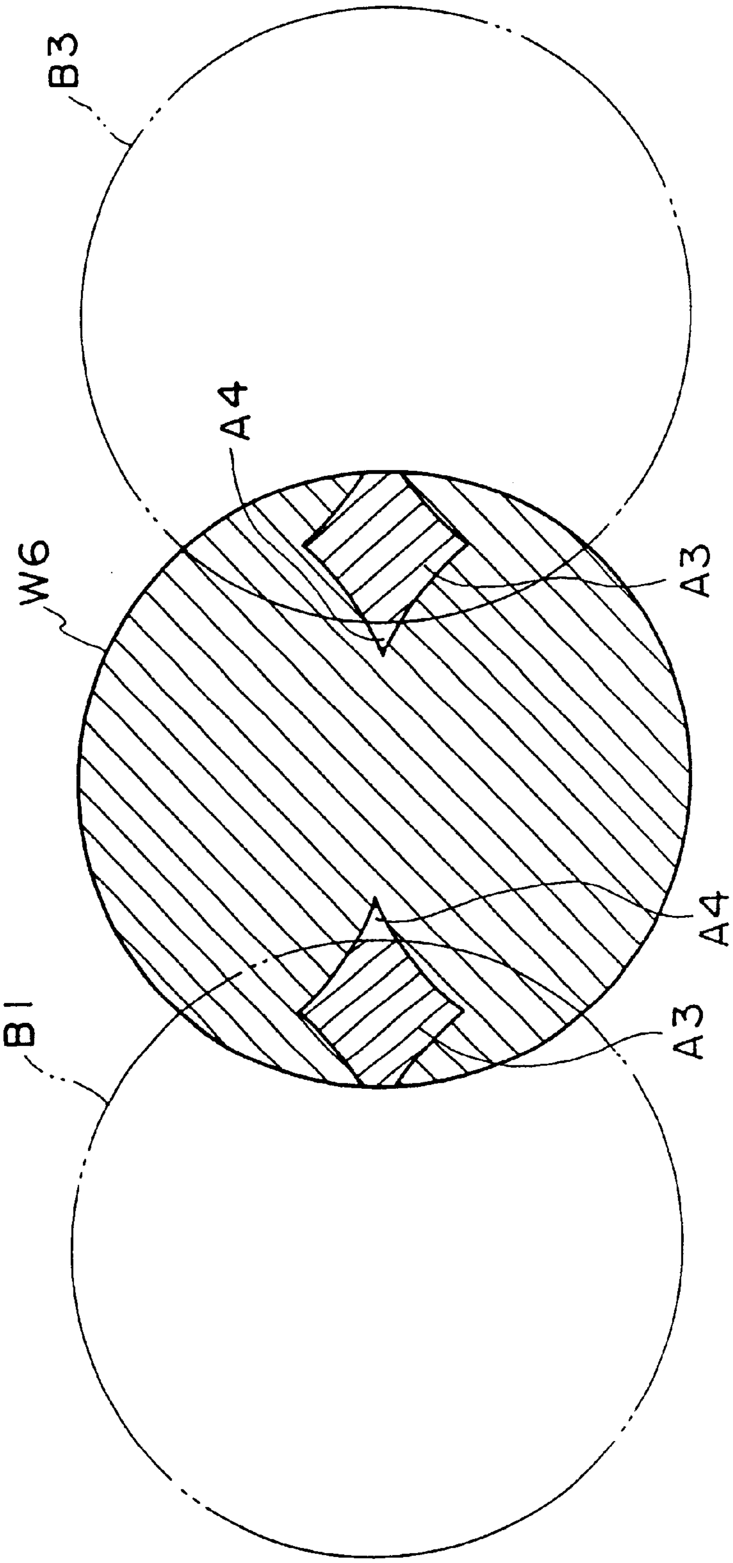
FIG. 11 PRIOR ART
FIG. 11 is an enlarged view for explaining a state on the photosensitive material on which droplets have been sprayed out twice in the conventional application device.

As a result, only a substantially triangular area a5, shown by white in the drawing, does not have water applied thereto. However, as compared with conventional structures (in which nozzles are provided in an even number of rows and in a pattern symmetrical at, for example, the left and right in FIG. 11), this area to which water is not applied is small, and the probability of non-uniform application caused by a nozzle clogging can be reduced. Further, as compared with conventional structures, because the number of overlapping sprayings can be kept to a minimum number of three overlapping sprayings, water can be applied more uniformly.

Here, the probability of an area of the photosensitive material 16 being covered by one drop of sprayed solution (a sprayed drop has a diameter d) will be described. Given that the probability of solution being sprayed from a nozzle hole is Po and the probability that solution will not be sprayed from a nozzle hole is Px, $$Po+Px=1 \quad (1)$$

$$Po>\text{about } 0.9 \quad (2).$$

Given that a point directly beneath a nozzle directed toward the surface of the photosensitive material 16 is the origin, the further away from the origin, the greater the variation in the size of one drop of solution. (The distance from the origin is denoted by D.) Moreover, the further away from the origin, the lower the probability Pr of coverage, due to, among other factors, offset in the position at which the solution is sprayed out onto.

The probability that an arbitrary point of the surface of the photosensitive material 16 will be covered by one drop of solution sprayed by one nozzle hole is $$Po\times Pr(D) \quad (3).$$

The probability that an arbitrary point on the surface of the photosensitive material 16 will remain uncovered is $$1-Po\times Pr(D)=Png \quad (4).$$

Thus, the following relationship is established.

$$Png+Po\times Pr(D)=1 \quad (5).$$

Currently, for spraying one time, a conventional equilateral triangle arrangement is employed as an arrangement of the nozzles for reducing as much as possible the amount of liquid for application. Here, the portion which most remains uncovered is the point D=d/2 which is furthest from the nozzle. Thus, the probability of remaining uncovered in the case of the equilateral triangle arrangement is $$\{1-Po\times Pr(d/2)\}\times\{1-Po\times Pr(d/2)\}\times\{1-Po\times Pr(d/2)\}=Png^3 \quad (6).$$

Next, the probability of remaining uncovered after two sprayings will be discussed.

In conventional techniques, at a point at which the probability of remaining uncovered the first time is $Png^3$, the probability of remaining uncovered decreases, after the second spraying, at the rate expressed by the following formula.

$$1-Po\times Pr(d/4) \quad (7).$$

Namely, the probability of remaining uncovered after the second time is $$Png^3\times\{1-Po\times Pr(d/4)\} \quad (8).$$

In the present invention, for ⅓ of the point at which the probability of remaining uncovered the first time is $Png^3$, $$Png^3\times\{1-Po\times Pr(d/8)\} \quad (9).$$

For ⅔ of the point at which the probability of remaining uncovered the first time is $Png^3$, $$Png^3\times\{1-Po\times Pr((\sqrt{13})d/8)\}\times\{1-Po\times Pr((\sqrt{13})d/8)\} \quad (10).$$

Here, what is in the { } brackets is a value around 0.1. Thus, it is clear that the probability of remaining uncovered in the present invention is much lower than the probability in the conventional art. In this way, in the present invention, in addition to the effects of applying solvent twice in the conventional art, the probability of a portion of the photosensitive material remaining uncovered due to the size of one drop of liquid being small due to clogging of a nozzle can be reduced, and the probability of a portion of the photosensitive material remaining uncovered due to the spraying direction being offset due to the configuration of the nozzle can be reduced.

Further, in the above-described embodiment, the photosensitive material 16 and the image receiving material are used as image recording materials. Water is applied by the spray head 12 of the application device 10 to the photosensitive material 16 which has been exposed, and the photosensitive material 16 and the image receiving material are superposed and heat development transfer is carried out. However, the present invention is not limited to the same, and water may be sprayed onto and applied to the image receiving material.

Further, the present invention is not limited to use of these materials, and may be applied as well to other image recording materials which are in sheets or rolls. The solvent for image formation may be a substance other than water. Further, the present invention may be used in applying developing solution onto a photographic printing paper in a developing device, or in applying water in a printer, or in a coater, or the like.

What is claimed is:

1. A method for spray application of a solvent for image formation on an image recording material, said method comprising the steps of:

(a) conveying at least one of an image recording material and a plurality of nozzles relative to one another, with the nozzles arranged in at least two rows transverse to the conveying direction and having an electric activator for spraying drops of solvent from the nozzles towards the image recording material;

(b) electrically operating the activator while performing the step of conveying and causing drops of solvent to be applied to the image recording material in rows from the at least two rows of the plurality of nozzles; and (c) repeating the step of electrically operating the activator at a timing which causes drops of solvent to be applied to the image recording material in rows, with one of the rows disposed between rows of drops of solvent previously applied.

2. The method of claim 1, wherein in the step of repeating, the drops of solvent in said one of the rows overlaps with the drops of solvent in each of the rows that said one of the rows is disposed between, and the step of repeating continues until solvent is applied in an overlapping manner covering substantially an entire surface of the image recording material.

3. The method of claim 1, wherein the image recording material is a photosensitive material.

4. The method of claim 1, wherein the image recording material is an image receiving material.

5. The method of claim 1, wherein the image recording material is a photosensitive material, and wherein said step of conveying and causing drops of solvent to be applied to the image recording material causes development of a latent image on the image recording material.

6. The method of claim 1, wherein the one of the rows, which is disposed between rows of drops of solvent previously applied, is applied immediately subsequent to the application of drops of solvent previously applied.

7. A method for spray application of a solvent for image formation on an image recording material, said method comprising the steps of:

(a) conveying at least one of an image recording material and a plurality of nozzles relative to one another, with the nozzles arranged in rows transverse to the conveying direction and having an electric activator for spraying drops of solvent from the nozzles towards the image recording material, wherein the rows are spaced at a substantially constant interval from one another;

(b) electrically operating the activator while performing the step of conveying and causing rows of drops solvent to be applied to the image recording material from the rows of nozzles; and (c) repeating the step of electrically operating the activator each time the image recording material and nozzles are conveyed a distance substantially equal to (x)(2m+1)/2, relative to one another, wherein the number of rows of nozzles is 2m+1, x is the interval between rows of nozzles, and m is an integer.

8. The method of claim 7, wherein the step of repeating causes drops of solvent on the image recording material to be applied in an overlapping manner, and the step of repeating continues until solvent covers substantially an entire surface of the image recording material.

9. The method of claim 7, wherein the image recording material is a photosensitive material.

10. The method of claim 7, wherein the image recording material is an image receiving material.

11. The method of claim 7, wherein the step of repeating applies at least one row of drops of solvent between a pair of rows of drops of solvent that were previously applied, with said at least one row overlapping both previously applied rows.

12. The method of claim 7, wherein the image recording material is a photosensitive material, and wherein said step of conveying and causing drops of solvent to be applied to the image recording material causes development of a latent image on the image recording material.

13. A device for spraying solvent on an image recording material for image formation thereon, the device comprising:

(a) a solvent circulator which circulates and supplies solvent;

(b) a conveyor having at least one pair of rollers which rotate for conveying image recording material along a path of travel; and (c) an application section having a plurality of nozzles disposed in staggered rows transversely across the path of travel, the rows being spaced a substantially constant interval from one another, with the number of rows of nozzles totaling to an odd number, the application section being connected in fluid communication with the solvent circulator for receiving solvent therefrom for spraying by the nozzles.

14. The device of claim 13, wherein the application section includes:

(a) a lower plate in which the nozzles are defined;

(b) a storing section connected in fluid communication to the solvent circulator, and storing at least some solvent received therefrom; and (c) a lever mechanism connected to the lower plate, the lever mechanism including an electrically activated actuator, which when activated, causes the lever mechanism to deform the lower plate and cause the nozzles to spray solvent from the storing section.

15. The device of claim 13, wherein the image recording material is a photosensitive material.

16. The device of claim 13, wherein the image recording material is an image receiving material.

17. The device of claim 14, wherein solvent spray amount is controlled by controlling an electrical voltage applied to the actuator, and thereby controlling deformation amount of the lower plate.

18. The device of claim 14, wherein the electrical voltage is intermittently applied to cause the nozzles to intermittently spray solvent in accordance with conveying movement of the image recording material to apply rows of drops of solvent thereon, with at least one row of drops of solvent being disposed between a pair of adjacent rows of drops of solvent previously applied, and contacting both previously applied rows.

19. The device of claim 14, wherein the lever mechanism includes:

(a) a lever plate provided in contact with the lower plate; and (b) a supporting portion supporting the lever mechanism, wherein the actuator, when activated, presses against the lever plate.

20. The device of claim 14, wherein the lower plate include opposite ends, and a sealing plate is provided at each end substantially parallel to the path of travel of the image recording material.

21. The device of claim 14, wherein the lower plate include opposite ends, with leakage preventing portions provided thereat substantially parallel to the path of travel.

22. The device of claim 14, wherein the nozzles spray solvent in accordance with conveying movement of the of the image recording material to spray solvent between rows of solvent previously applied.

23. The device of claim 14, wherein the actuator comprises a piezoelectric element.

24. The device of claim 13, further comprising the image recording material, wherein the image recording material is a photosensitive material having a latent image thereon, and wherein application of said solvent results in development of the latent image.

25. The device of claim 13, wherein said nozzles are operable to spray drops of solvent each time the image recording material and nozzles are conveyed a distance substantially equal to (x)(2m+1)/2, relative to one another, and the number of rows of nozzles is (2m+1), the interval between the rows of nozzles is x, and m is an integer.

* * * * *